UNITED STATES PATENT OFFICE.

BERTHA R. THOMAS, OF NEW YORK, N. Y., ASSIGNOR, BY MESNE ASSIGNMENTS, TO EDWARD G. SOLTMANN, OF NEW YORK, N. Y.

COMPOSITION OF MATTER FOR THE REMOVAL OF INK.

No. 878,689.  Specification of Letters Patent.  Patented Feb. 11, 1908.

Application filed January 8, 1906. Serial No. 295,041.

*To all whom it may concern:*

Be it known that I, BERTHA R. THOMAS, a citizen of the United States, and a resident of the city, county, and State of New York, have invented a certain new and useful Composition of Matter for the Removal of Ink, of which the following is a specification.

My invention relates to a composition of matter for the removal of ink especially from tracing cloth or linen to allow of changes being made in the drawing without injuring the cloth.

In making my composition I combine the following ingredients in these proportions:

| | |
|---|---|
| Linseed oil | 1 part. |
| Alcohol | 8 parts. |
| Glycerin | 2 parts. |
| Oxalic acid | 1 part. |
| Water | 3 parts. |
| Creolin | $\frac{1}{15}$ part. |

While I have specified these proportions, it is to be understood that I do not intend to confine myself thereto, as they may be varied within wide ranges without departing from my invention. Furthermore, it is not necessary to combine all of the ingredients stated in making the composition, but the proportions and the ingredients named are preferred, as they give more satisfactory results.

In making the composition I cut the oil with powdered pumice stone or glass sand in a mortar and gradually add alcohol, agitating the mixture to further mix the oil. I then add acid and water, glycerin and creolin. When this is done I agitate and filter the mixture.

In using the composition to remove ink spots or lines from tracing cloth or linen, the solution is applied to the cloth and in a manner, for example, by a brush, sponge or cloth. The solution is allowed to remain for a short time, when it may be removed by simply wiping the tracing cloth, when all the ink will be thoroughly eradicated from that part of the cloth to which the solution has been applied. The solution removes the ink from the cloth without any injury whatever thereto, and leaves the cloth with the glazed surface so that ink can be again applied without any danger of the ink spreading.

While the object of making this solution is to remove ink from tracing paper, as before stated, I have also discovered that it may be satisfactorily used in retouching photograph prints.

It is well known that the surface of photographic negatives sometimes contains spots or scratches owing to the fact that certain parts of the film have been accidentally removed. When a print is made from such a negative, these spots or scratches appear darker than other parts owing to the fact that the light passes more readily through the negative when it is spotted or scratched. These spots or scratches may be removed from the print by applying my composition to the same, which has the effect of lightening these spots or scratches and causing them to take on the same shade or color as the other parts of the print. I can also use my solution to lighten any parts of the print that may have been made too dark by over printing.

Having now described my invention, what I claim as new and desire to secure by Letters Patent is:

1. A composition of matter containing oil, alcohol, glycerin and acid.

2. A composition of matter containing linseed oil, alcohol, glycerin and acid.

3. A composition of matter containing oil, alcohol, glycerin and oxalic acid.

4. A composition of matter containing linseed oil, alcohol, glycerin and oxalic acid.

5. A composition of matter consisting of oil one part, alcohol eight parts, glycerin two parts, acid one part, water three parts and creolin one fifteenth part.

6. A composition of matter consisting of linseed oil one part, alcohol eight parts, glycerin two parts, acid one part, water three parts and creolin one fifteenth part.

7. A composition of matter consisting of oil one part, alcohol eight parts, glycerin two parts, oxalic acid one part, water three parts and creolin one fifteenth part.

8. A composition of matter consisting of linseed oil one part, alcohol eight parts, glycerin two parts, oxalic acid one part, water three parts, and creolin one fifteenth part.

In witness whereof I have hereunto set my hand at the city, county and State of New York, this fourth day of January, 1906.

BERTHA R. THOMAS.

In presence of—
JNO. W. THOMAS,
T. R. RICHARDS.